United States Patent Office 3,368,870
Patented Feb. 13, 1968

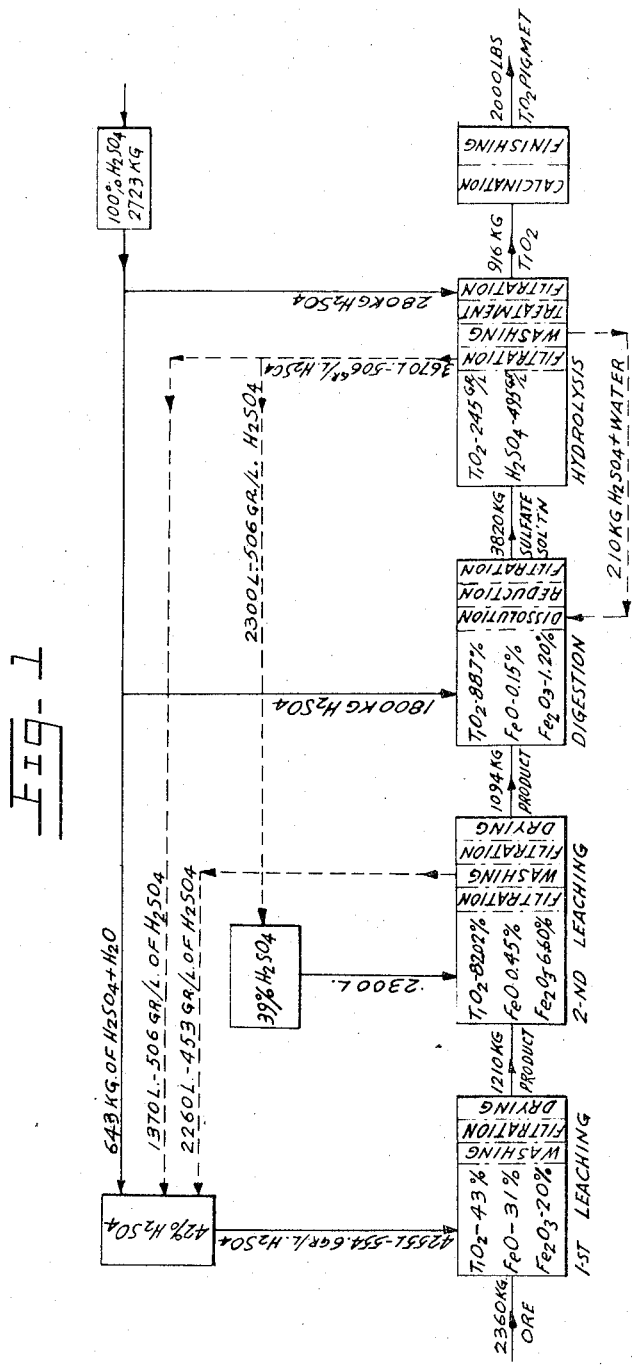

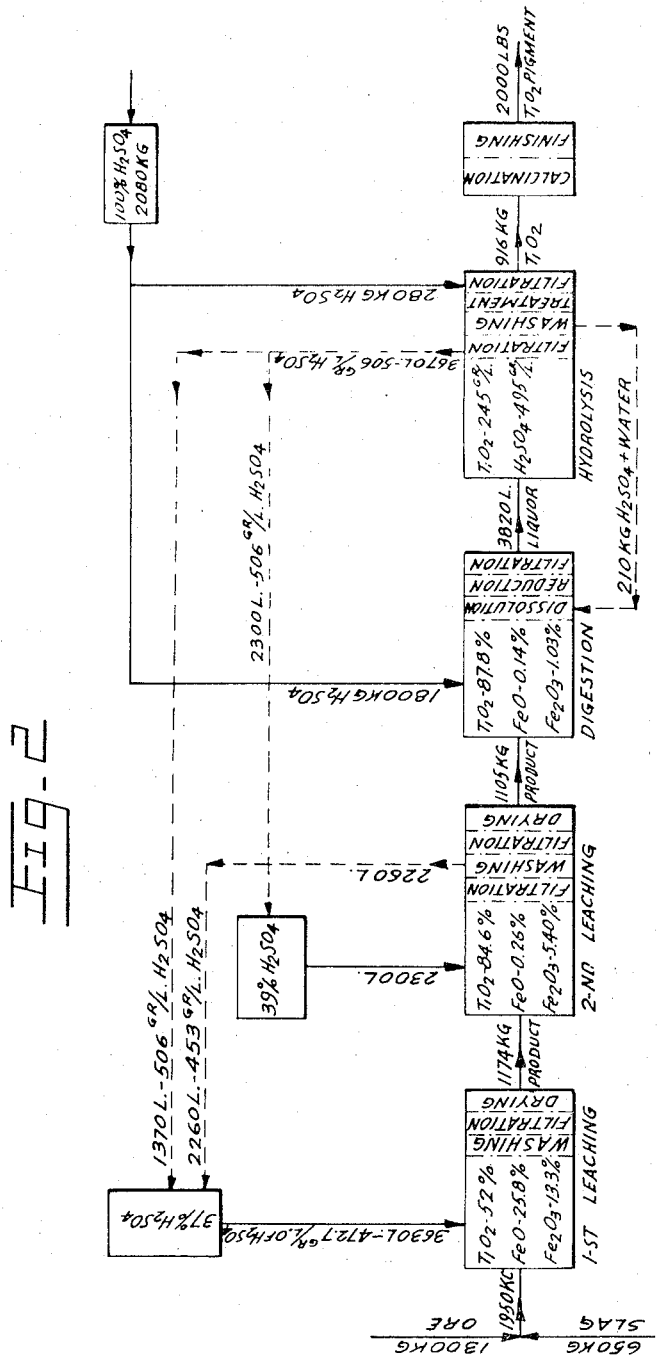

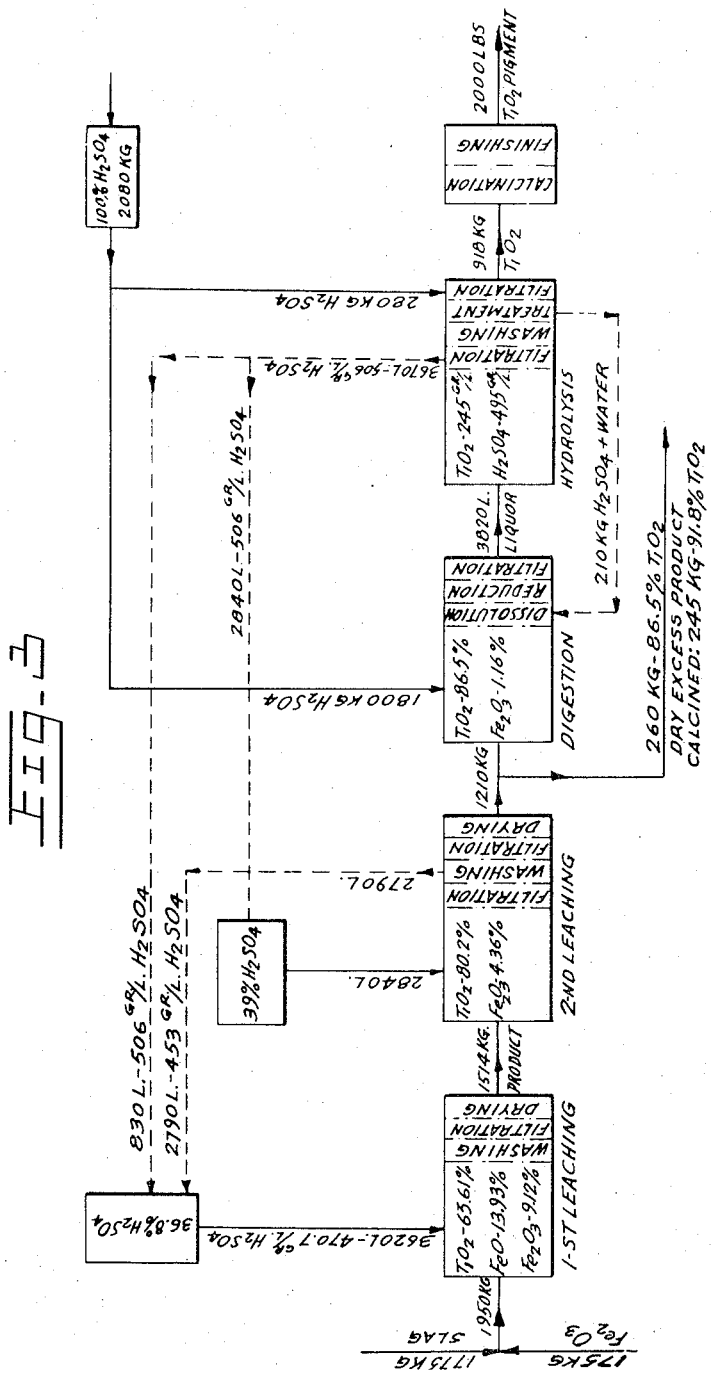

3,368,870
METHOD OF PRODUCING TITANIUM HY-
DROXIDE AND HIGH GRADE PIGMENTS
PRODUCED THEREFROM
Nicolas Soloducha, 3487 Northcliffe Ave.,
Montreal, Quebec, Canada
Filed Dec. 4, 1964, Ser. No. 415,904
Claims priority, application Canada, Dec. 6, 1963,
890,682
4 Claims. (Cl. 23—202)

ABSTRACT OF THE DISCLOSURE

A process is described for the beneficiation of titaniferous ores by subjecting the ore to pressure leaching in at least two stages at elevated temperature and super-atmospheric pressure. Essentially, the process consists in carrying the first pressure leaching in the presence of 25-55% strength by weight sulfuric acid in an amount from 10% less to 10% more than the theoretical amount required, the second leaching being carried out with 25-40% strength by weight sulfuric acid in a large excess up to 1000% over the theoretical amount required to remove the remaining metallic impurities following the first leaching. The process results in high grade product which can then be subjected to digestion and hydrolysis. If the digestion and hydrolysis are carried out with sulfuric acid and the hydrolysis is under super-atmospheric pressure, the total acid for the first and second leaching can be obtained by recirculating the spent acid from the hydrolysis stage without any water evaporation from spent acid in the case when ore has a minimum 52% $TiO_2$.

This invention relates to improvements in the processes for the manufacture of hydrous titanium oxide. More specifically, it relates to a new improved method of leaching, digestion and hydrolysis of titaniferous ores such as ilmenite and others, under conditions of high pressure and high temperature, in order to produce a very high grade titanium dioxide pigment.

The customary commercial procedure of making titanium dioxide from titanium ores involves several well known stages. In the first stage, the titaniferous raw material, such as ilmenite ore, is digested with strong sulfuric acid to form a solid mass or cake containing titanium sulfate, ferrous and ferric sulfates, as well as sulfates of other metallic impurities and the gangue. The sulfated mass is then leached with water or dilute sulfuric acid to obtain a solution containing relatively large quantities of titanium sulfate together with ferrous, ferric and other sulfates which are all dissolved while the undissolved solids are in suspension. Metallic iron is usually introduced to reduce ferric to ferrous sulfate. The next stage consists in clarifying the liquor to separate the undissolved ore, the gangue and the slime residue.

By cooling the clarified solution, the larger part of ferrous sulfate is removed by crystallization. However, undesirable sulfates, such as, e.g. those of chromium, vanadium, remain in the solution. The clarified and filtered solution is then hydrolyzed and crude hydrous titanium oxide filtered off. The crude hydrous titanium oxide is ordinarily conditioned, and finally calcined at high temperature to form the final titanium dioxide product.

It is also well known that under conditions of high temperature and pressure, chemical reactions such as those above mentioned, require considerably less time and are more complete. For example, ilmenite which at normal temperature is practically insoluble in dilute sulfuric acid, can be leached with dilute sulfuric acid at high temperature and under high pressure, and such usual impurities as the oxides of iron, calcium, magnesium, aluminum, manganese, chromium, vanadium, phosphorus and the like can be leached out and removed completely or in part, depending on leaching time, strength of acid, temperature and pressure.

Many authors have proposed leaching, digestion and hydrolysis of ilmenite at high pressure and temperature, and a number of patents were issued, for example, United States Patents:

1,402,256, Jan. 3, 1922, Buckman; 1,410,056, Mar. 21, 1922, Buckman; 1,429,841, Sept. 19, 1922, Buckman; 1,655,940, Jan. 10, 1928, D'Ans and Sommer; 1,888,993, Nov. 29, 1932, Lubowsky; 1,919,425, July 25, 1933, Farup; 1,959,765, May 22, 1934, Saklatwalla and Dunn; 2,127,247, Aug. 16, 1938, Dawson et al., and many others are connected in one way or another with pressure leaching, digestion or hydrolysis.

The Department of Mines and Technical Surveys, Mines Branch, in Ottawa, Canada, has issued Research Report MD 176 by B. J. P. Whalley, dated March 15, 1955. This report strongly recommends, especially for treatment of Canadian ilmenites, the extraction of impure (95% $TiO_2$) titanium dioxide from ilmenite by pressure leaching with dilute sulfuric acid. However, until now pressure leaching, digestion or hydrolysis of ilmenite has not been in use in the titanium industry on a commercial scale.

The applicant has studied this matter and has arrived at the conclusion that the application of high pressure leaching, digestion and hydrolysis with all its advantages in the pigment industry, although well known from a chemical and technological point of view, can only be successful from a commercial viewpoint if all operations are carried out automatically and continuously. With this in mind, the present invention aims to provide a method of continuously carrying out the leaching, digestion and hydrolysis steps necessary as will be described below in this application.

As a review of what has been done along these lines, reference is made to U.S. Patent No. 1,959,765 by B. D. Saklatwalla and H. E. Dunn, dated May 22, 1934, which comes somewhat near to a solution to this problem. They recommend hydrolysis in one continuous stream in a very long tube with acid-proof lining. However, this hydrolyzer has certain limitations in its operation, and certain disadvantages as mentioned in the applicant's Canadian Patent No. 610,334.

U.S. Patent No. 2,127,247, dated August 16, 1938, D. H. Dawson et al., recommended a method which consists of the first leaching of the ilmenite with dilute sulfuric acid under pressure, and then attacking the filtered residue in the conventional method with strong acid without pressure. However, in order to make this method workable, they advised as a first step the reduction of the ferric compounds of the ferro-titanium ore, such as ilmenite, to ferrous compounds by heating the ore in the presence of any carbonaceous or other reducing agent at a temperature substantially below 800 degrees centigrade.

Such a reduction of the ferric to ferrous compounds, at temperatures between 500 and 800° C. in the presence of reducing agents where a strongly reducing atmosphere must be maintained, is not only very complicated to carry out on a large commercial scale, but it also is very costly.

All tests show that the removal of iron impurities from any titaniferous ore, reduced or not, down to less than 1% is practically impossible, even if up to 300% excess acid or more is used over the amount theoretically required. In addition, applicant's tests show that if all or a large fraction of ferric oxide in ilmenite is reduced to ferrous oxide, and in such a case reduced titanium ($Ti_2O_3$) is also formed, and if chromium and vanadium compounds are present in the ilmenite, the chromium and vanadium impurities cannot be removed by leaching.

As an example: Sorel slag having the following analysis: $TiO_2$—70%, FeO—15.4%, $SiO_2$—3.60%, $Cr_2O_3$—0.19%, $V_2O_5$—0.57%, MgO—4.74%, CaO—0.63%, MnO—0.27%, $Al_2O_3$—4.55%, other—0.05% was leached with 40% dilute sulfuric acid in the ratio of 2 liters of such acid to 1000 gr. of slag. The dry leached product had the following analysis: $TiO_2$—84.61%, Fe—1.29%, $SiO_2$—4.62%, $Cr_2O_3$—0.22%, $V_2O_5$—0.50%, MgO—0.48%, CaO—0.53%, MnO—0.1%, $Al_2O_3$—1.90%, L.O.I.—5.24%. This test shows that the $Cr_2O_3$ and nearly all of the $V_2O_5$ were not removed by leaching. It is also well known that if all iron, chromium and vanadium contents are reduced in an ilmenite ore or a titanium slag, such ore or slag must also be re-oxidized before leaching, otherwise the chromium and vanadium cannot be leached out. The oxidizing operation is very cumbersome and costly.

The applicant has found that, by adding to such reduced ore or slag a sufficient amount of ferric oxide, the chromium and vanadium can be removed by leaching. This can be accomplished either by adding ferric oxide directly to the slag, or by mixing the slag with any ferro-titanium ore containing ferric oxide or by adding a minor amount of ferric oxide as required and then bubbling oxidizing gas such as air through the slag-acid slurry during the leaching. This and other steps will be described in detail later.

Tests also show that pressure hydrolysis cannot be applied to produce high grade titanium dioxide pigment if the content of chromium and vanadium in the ore or slag is not reduced to less than 0.02% prior to the hydrolysis. The applicant has found that in order to produce the highest quality of titanium pigment by pressure hydrolysis utilizing the minimum amount of sulfuric acid for this purpose, a major part of iron and all other metallic impurities in the titanium ore must be removed prior to hydrolysis, and the leaching operation must be conducted in at least two steps, as follows:

First, the ilmenite ore is leached with dilute $H_2SO_4$ of 25–55% by weight concentration, preferably of 40–45% by weight concentration, the acid being in an amount substantially equivalent to the theoretical amount required to solubilize from the titaniferous ore all impurities, except $SiO_2$, without practically any excess acid.

In practice, the amount of acid used is conveniently between 10% less and 50% more, preferably 10% more than the amount theoretically required to solubilize all metallic impurities.

The resultant product is then leached for a second time with dilute acid of 25 to 40% strength but, this time, with a large excess of acid over the amount theoretically required to remove by dissolution the impurities remaining after the first leaching step. In this manner, not only will the leached product from the second leaching contain a minimum amount of the undesirable impurities, but the acid consumption is also reduced to a minimum per ton of pigment. In practice, 500 to 600% excess acid is used over the amount theoretically required for the second leaching although 1000% can be used.

(a) As examples, in conventional titanium pigment plant processes, 1.9 tons of Indian ilmenite with 57% $TiO_2$ and 3.2 tons of $H_2SO_4$ are required to produce one ton of pigment. To produce the same from slag containing 70% $TiO_2$, 1.6 tons of slag and 2.7 tons of $H_2SO_4$ are required.

(b) Using St. Urbain ilmenite concentrate with 43% $TiO_2$, the ore requirement will be 2.6 tons and 4.5 tons of $H_2SO_4$ will be required per one ton of pigment.

By the present method, utilizing the double leaching step followed by digestion and pressure hydrolysis, preferably by means of the equipment described in the applicant's Canadian Patents No. 610,334 and No. 644,299, or by using any other suitable equipment for this purpose, 2.6 tons of 43% $TiO_2$ ilmenite concentrate and only 3 tons of $H_2SO_4$ are required for the production of one ton of pigment. If any other ferro-titanium ore with over 52% of $TiO_2$ such as Indian ilmenite or a mixture of ilmenite and Sorel slag is used to produce titanuim pigment by the applicant's double pressure leaching followed by digestion and pressure hydrolysis as will be described, the amount of $H_2SO_4$ necessary to produce one ton of pigment can be brought down to about 2.3 tons.

In order that the applicant's process may be more clearly understood, reference will be made to the accompanying drawings showing by way of illustration flow diagrams showing the flow of products from starting materials to the finished product, and wherein:

FIGURE 1 is a flow diagram showing the flow of products and acid balance flow required to produce one short ton of pigment from 2.6 tons of ilmenite with 43% $TiO_2$ starting material being completely ore.

FIGURE 2 is a flow diagram corresponding substantially to FIGURE 1 wherein a mixture of slag and ore is used as starting materials.

FIGURE 3 is a flow diagram corresponding substantially to FIGURE 2 wherein ferric oxide is added to slag to form the starting materials.

With reference to the flow diagram of FIGURE 1, the flow of the products is shown starting from ore to finished products of titanium dioxide and illustrating acid balance flow required to produce one short ton of pigment from 2.6 tons of ilmenite with 43% $TiO_2$.

Table I shows analysis of the ore, of the first and second dry leached product, and of the calcined titanium dioxide, respectively.

TABLE I—ANALYSES

| St. Urbain Ilmenite Concentrate, Percent | Dry First Leach Product, Percent | Dry Second Leach Product, Percent | Calcined Titanium Dioxide from Hydrolysis, Percent |
|---|---|---|---|
| $TiO_2$, 43.00 | 82.02 | 88.700 | $TiO_2$, 99.70. |
| FeO, 31.00 | 0.45 | 0.150 | Fe, 0.0012. |
| $Fe_2O_3$, 20.00 | 6.60 | 1.200 | |
| $SiO_2$, 1.05 | 2.04 | 2.200 | $SiO_2$, 0.0200. |
| MnO, 0.22 | 0.03 | 0.015 | |
| $Al_2O_3$, 0.78 | 0.32 | 0.23 | $Al_2O_3$, 0.0200. |
| MgO, 3.16 | 0.77 | 0.27 | |
| CaO, 0.12 | 0.04 | 0.25 | CaO, 0.0030. |
| $Cr_2O_3$, 0.26 | 0.05 | 0.013 | $Cr_2O_3$, 0.0002. |
| $V_2O_5$, 0.36 | 0.06 | 0.020 | $V_2O_5$, 0.0001. |
| $P_2O_5$, 0.02 | 0.009 | 0.009 | $P_2O_5$, 0.0300. |
| Other Zr. Cb. etc., 0.03. | 0.020 | 0.015 | ZnO, 0.0020. |
| | | | $Sb_2O_3$, 0.0030. |
| | | | $ZrO_2$, 0.0020. |
| | | | $Cb_2O_3$, 0.0120. |
| | | | $K_2O$, 0.0180. |
| L.O.I. | 7.591 | 7.504 | L.O.I., 0.1800. |

As an example, in a continuous operation, St. Urbain concentrate having the above analysis (Table I) was leached with dilute acid under pressure at 220° C. by means of apparatus described in applicant's Canadian Patent No. 610,334, Dec. 13, 1960, Pressure Leaching Apparatus. Briefly, this apparatus provides apparatus for effecting continuous leaching, digestion or hydrolysis of ores, particularly titaniferous ores with mineral acids, and at high temperatures and pressures. The basic elements of this apparatus include the combination of a plurality of jacketed pipes, which are lined with lead or other acid proof materials when acids are used, these pipes being arranged in a series of separate circuit systems inter-connected one to the other by by-pass lines. The pipe circuit systems are designed to follow endless contours, and are disposed in stacked relationship one above the other. When used in an initial stage such as leaching or digestion, a main feed pump supplies pre-mixed finely ground ore in suspension to an expansion tank connected to a first one of the pipe line circuits. Each separate pipe circuit is provided with a circulation pump to maintain the circulation and pressure within the individual lines. Heating means, for example steam is supplied to certain of the initial pipe circuits to provide the necessary reaction temperatures while at least one of the last pipe circuits is provided with circulating cooling means so as to reduce the reaction liquid solution to temperatures permitting discharge of the liquid solution from the system (i.e. below boiling point) for further processing. In one preferred construction the liquid solution is delivered directly from the last cooled pipe circuit to separation means in the form of a self-cleaning thickener and hydrocyclone. Alternatively, means are provided whereby the treated material can be made to by-pass the separation means and be subjected to further treatment such as, e.g. filtering and washing.

The same general arrangement of interconnected pipe circuit systems is utilized for hydrolysis with the difference that the expansion tank is connected to a second, third or fourth pipe circuit and not the first pipe circuit as in the case of the digester. The purpose of this installation is to avoid the use of excess acid in the hydrolysis and to obtain the best possible grade of hydrous titanium oxide as will be explained later. Briefly, by the use of the separate and controllable pipe circuit systems, the hydrolysis can be controlled so that, once the system is filled with solution and this solution is being circulated under pressure, the fresh solution delivered through the expansion tank is mixed with partially hydrolyzed solution and is pumped back up through the first of the circuit systems when it is quickly heated to the required temperature and recirculated down through the systems.

The quantities of ore and dilute acid utilized in the aforedescribed leaching operation, which is mostly recirculated acid from hydrolysis, are shown on the flow diagram of FIGURE 1.

The dilute acid charge amounted to 4255 liters having a concentration of 554.6 gr./l. of $H_2SO_4$, or 2360 kg. of $H_2SO_4$ as free acid for 2360 kg. of ore or about only 10% excess acid over the amount theoretically required to remove all impurities except silica from the ore. This is calculated below.

After heating for four hours retaining time, cooling, washing, filtering and drying, the dry residue, 1210 kg., the composition of which is shown on Table I, was leached for a second time in the same equipment with 2300 liters of acid recirculated from hydrolysis having 506 grams per liter of $H_2SO_4$ which equals to 1164 kg. of free acid or about 650% of excess acid over the amount theoretically required to remove the metallic impurities in the charge. After heating for three hours at 200° C. retaining time, cooling, washing, filtering and drying, the residue (1094 kg.), the analysis of which is shown in Table I, was stored for digestion.

Calculations of acid required to remove all impurities from the ilmenite concentrate and from the dried product from the first leaching are shown in the following Table II.

TABLE II

|  | 100 parts of ore | $H_2SO_4$ required for impurities in ore | 100 parts first leach | $H_2SO_4$ required for second leaching |
| --- | --- | --- | --- | --- |
| $TiO_2$ | 43.00 | -------- | 82.02 | -------- |
| FeO | 31.00 | 42.19 | 0.45 | 0.61 |
| $Fe_2O_3$ | 20.00 | 36.74 | 6.60 | 12.12 |
| $SiO_2$ | 1.05 | -------- | 2.04 | -------- |
| MnO | 0.22 | 0.30 | 0.03 | 0.04 |
| $Al_2O_3$ | 0.78 | 2.25 | 0.32 | 0.76 |
| MgO | 3.16 | 7.68 | 0.77 | 1.87 |
| CaO | 0.12 | 0.21 | 0.04 | 0.07 |
| $Cr_2O_3$ | 0.26 | 0.50 | 0.05 | 0.10 |
| $V_2O_5$ | 0.36 | 0.97 | 0.06 | 0.16 |
| $P_2O_5$ | 0.02 | 0.07 | 0.009 | 0.03 |
| Others | 0.03 | 0.06 | 0.020 | 0.05 |
| L.O.I. | -------- | -------- | 7.591 | -------- |
| Total | 100 | 90.97 | 100 | 15.81 |

In the first leaching operation, the excess acid was only about 10%, i.e. 100 parts of $H_2SO_4$ to 100 parts of ore instead of 91 parts as theoretically required.

To remove the remaining impurities in the second leaching operation from 1210 kg. of dry first leach product, 191 kg., i.e. 1210×15.81/100, of $H_2SO_4$ is required. Recirculated acid from hydrolysis in the quantity of 2300 liters with 506 gr./l. or 1164 kg. of free $H_2SO_4$ was used or 1164/191=6.0 times more than required.

As can be seen from the analyses of charged ore and leached product from first the leaching operation, 93% of metallic impurities were removed. In the second leaching operation, this percentage was brought to 98.7% and only 1.3% of the metallic impurities contained in the ore charged in were left for digestion and hydrolysis.

The dry product from the second leaching, 1094 kg. with 88.7% $TiO_2$, was digested with 1935 kg. of 93% sulfuric acid or 1800 kg. of 100% acid in the continuous digester described in applicant's Canadian Patent No. 664,299, issued July 3, 1962. Briefly, this apparatus is capable of digesting a fluid slurry of leached titanium materials and acid as prepared by the apparatus of the applicant's Canadian Patent 610,334 to cured cake form and discharging this cured mass in powder form for subsequent treatment as required. To this powdered sulfate cake of this digestion, water from washing of hydrolyzed titania with 210 kg. of $H_2SO_4$ was added in such proportion that after dissolution of cake, reduction with scrap iron, filtering, and removing all undissolved solids, silica, etc. by filtration, the titanium sulfate solution with 245 gr./l. of $TiO_2$ and 495 gr./l. of active acid was formed.

Active acid is $H_2SO_4$ combined as titanyl and titanium sulfate and free $H_2SO_4$ in the titanium sulfate solution, all of which after hydrolysis will be the free acid. The content of this sulfate solution shows:

|  | Gr./l. |
| --- | --- |
| $TiO_2$ | 245 |
| $H_2SO_4$ as active acid | 495 |
| $Ti_2O_3$ | 4.28 |
| Fe as $FeSO_4$ if reduced by scrap iron (or 2.7 gr./l. Fe if reduced by zinc) | 4.75 |
| Other metals as sulfates | 0.34 |

The above mentioned titanium sulfate solution, 3820 liters per short ton of $TiO_2$ was hydrolyzed in continuous operation by means of the hydrolyzer described in Canadian Patent 610,334, by heating at 160° C. for 45 minutes, and then rapidly cooled, released from pressure, filtered, washed, treated in a conventional manner, conditioned, calcined, and finished to an excellent pigment of anatase grade as well as of rutile grade by adding the required seeds.

The analysis of the hydrolysate not treated to pigment, but only washed and calcined titanium dioxide is shown above on Table I.

On the accompanying flow diagram of FIGURE 1 is shown the balance of acid used to produce one short ton of titanium dioxide from 43% to $TiO_2$ ilmenite.

For digestion of the product obtained from the second leaching, i.e. 1094 kg. having 88.7% $TiO_2$ and 1.55% iron and other metallic impurities as oxides, 1800 kg. of $H_2SO_4$ were used and 210 kg. of $H_2SO_4$ were added with water used for dissolution of titanium sulfate. This water containing about 8% of $H_2SO_4$ was the spent water from the titanium hydrolysate treatment by washing. These 2010 kg. of $H_2SO_4$ in the titanium sulfate solution contained 1891 kg. of active acid.

After hydrolysis, 3670 liters of acid with 506 gr./l. of free $H_2SO_4$ were filtered off for reuse in the leaching processes. The spent acid filtered off from the hydrolysate had the following characteristics:

3670 liters of spent acid or 4750 kg. with sp. gr. 1.2941
506 gr./l. or 1857 kg. of free $H_2SO_4$
5.2 gr./l. Fe as $FeSO_4$
2.1 gr./l. $Ti_2O_3$
0.5 gr./l. other metals as sulfates Part of this spent acid, 2300 l. with 1164 kg. of free $H_2SO_4$, was recirculated to the second leaching and the balance of this acid, 1370 liters, was used to make up acid for the first leaching. The spent acid, 2300 liters, together with 506 gr./l. $H_2SO_4$ was directed to the second leaching and only a small part of free acid was used to remove about 6% of iron and other metallic impurities, and was filtered off, as slightly more dilute acid, 2260 l. with 452 gr./l. or 1024 kg. of free $H_2SO_4$. This acid was used for make-up acid for the first leaching.

Thus, the dilute acid for the first leaching was made up as follows:

1370 l. with 506 gr./l. or 693 kg. of free $H_2SO_4$ from hydrolysis
2260 l. with 453 gr./l. or 1024 kg. of free $H_2SO_4$ from second leaching
380 l. with 1700 gr./l. or 643 kg. of free $H_2SO_4$ from fresh acid
245 l. of water 4255 l. with 554.6 gr./l. or 2360 kg. of free $H_2SO_4$

*Characteristics of this acid*

4255 liters of make-up acid or 5660 kg. with Sp. Gr. 1.33
544.6 gr./l. or 2360 kg. of free $H_2SO_4$
18.3 gr./l. Fe as $FeSO_4$ and $Fe_2(SO_4)_3$
0.77 gr./l. other metals as sulfates
0.7 gr./l. $TiO_2$ The above-mentioned dilute acid with 42% by weight of free $H_2SO_4$ and only with about 3.5% of iron and other sulfates by weight, is an excellent mixture of recirculated and fresh acid for the first leaching.

As was previously mentioned, if any ferro-titanium ore or a mixture of ilmenite and Sorel slag having over 52% of $TiO_2$ is used as described above to produce titanium dioxide pigment, the consumption of sulfuric acid (100% $H_2SO_4$) can be brought down to 2.3 tons per ton of pigment. As an example, a mixture of two thirds of St. Urbain ilmenite with 43% $TiO_2$ and one-third of Sorel slag with 70% $TiO_2$ analyses of which aree shown hereinbefore, was leached in two leaching steps, digested and hydrolyzed under pressure as described above for St. Urbain ilmenite. To produce one short ton of titanium pigment from such a mixture, 1300 kg. of 43% $TiO_2$ ilmenite and 650 kg. of 70% $TiO_2$ Sorel slag were used.

This mixture of ore and slag was leached in two successive leaching steps, digested, hydrolyzed and finished as pigment in the same manner with the same results as it was described above, using 43% $TiO_2$ ilmenite.

The quantity of product and acid required per short ton of pigment as well as the flow of products and acid are shown on the accompanying flow diagram of FIGURE 2.

The following Table III shows the results of analysis of the mixture of ore and slag, as well as of the analysis of leached products after the first and second leaching, respectively.

TABLE III.—ANALYSES

| | Charge—⅔ ore, ⅓ slag, Percent | Product of First Leaching, Dry, Percent | Product of Second Leaching, Dry, Percent |
|---|---|---|---|
| $TiO_2$ | 52.00 | 84.60 | 87.80 |
| FeO | 25.80 | 0.26 | 0.14 |
| $Fe_2O_3$ | 13.33 | 5.40 | 1.03 |
| $SiO_2$ | 1.90 | 3.10 | 3.15 |
| MnO | 0.25 | 0.19 | 0.16 |
| $Al_2O_3$ | 2.03 | 0.61 | 0.34 |
| MgO | 3.68 | 0.24 | 0.13 |
| CaO | 0.29 | 0.15 | 0.09 |
| $Cr_2O_3$ | 0.22 | 0.035 | 0.016 |
| $V_2O_5$ | 0.43 | 0.070 | 0.020 |
| $P_2O_5$ | 0.02 | 0.008 | 0.006 |
| Others | 0.05 | 0.030 | 0.018 |
| L.O.I. | --- | 5.307 | 7.100 |

On Table IV are shown calculations of $H_2SO_4$ required to remove all impurities except silica from the charged raw material and from the dry product obtained from the first leaching per hundred parts.

TABLE IV

| | 100 parts of mixture | $H_2SO_4$ required for impurities in the mixture | 100 parts of first leach product | $H_2SO_4$ required for second leaching |
|---|---|---|---|---|
| $TiO_2$ | 52.00 | --- | 84.60 | --- |
| FeO | 25.80 | 35.11 | 0.26 | 0.35 |
| $Fe_2O_3$ | 13.33 | 25.50 | 5.40 | 9.03 |
| $SiO_2$ | 1.90 | --- | 3.10 | --- |
| MnO | 0.25 | 0.35 | 0.19 | 0.26 |
| $Al_2O_3$ | 2.03 | 5.85 | 0.61 | 1.76 |
| MgO | 3.68 | 9.68 | 0.24 | 0.63 |
| CaO | 0.29 | 0.51 | 0.15 | 0.26 |
| $Cr_2O_3$ | 0.22 | 0.43 | 0.035 | 0.06 |
| $V_2O_5$ | 0.43 | 1.16 | 0.070 | 0.19 |
| $P_2O_5$ | 0.02 | 0.07 | 0.008 | 0.03 |
| Other | 0.05 | 0.09 | 0.030 | 0.06 |
| L.O.I. | --- | --- | 5.307 | --- |
| Total | 100 | 78.75 | 100 | 13.53 |

For the first leaching of 1950 kg. per short ton of pigment, of the above mentioned charge, the theoretical amount of $H_2SO_4$ required is $1950 \times 78.75/100 = 1536$ kg. and—with 10% excess acid—1690 kg., which quantity is fully covered by recirculated acid from hydrolysis and second leaching in a quantity of 3630 liters with 472.7 gr./l. of $H_2SO_4$ or 1717 kg. of free $H_2SO_4$.

This dilute acid for the first leaching was made up as follows:

1370 l. with 506 gr./l. or 693 kg. of free $H_2SO_4$ from hydrolysis
2260 l. with 453 gr./l. or 1024 kg. of free $H_2SO_4$ from second leaching 3630 l. with 472.7 gr./l. or 1717 kg. of free $H_2SO_4$

*Analysis of this acid*

3630 liters of return acid or 4650 kg. with sp. gr. 1.28
472.7 gr./l. or 1717 kg. of free $H_2SO_4$
10.0 gr./l. Fe as $FeSO_4$ and $Fe_2SO_4$
3.0 gr./l. other metals as sulfates
0.8 gr./l. $TiO_2$ After heating for four hours in a closed container, at 210° C. temperature, cooling, washing, filtering and drying, the dry residue of 1174 kg. the analysis of which is shown in Table III was stored for the second leaching and the filtrate was discarded.

The second leaching was accomplished in the same manner as that previously described for the second leaching of the product obtained from 43% $TiO_2$ St. Urbain ilmenite with the same recirculated quantity of acid obtained from hydrolysis (610% excess acid).

The dry residue (1105 kg.), the analysis of which is in Table III, was stored for digestion. The slightly diluted acid from the second leaching (2260 liters) was recirculated as make-up acid for the first leaching.

The digestion of the product obtained from the second leaching was accomplished in the same equipment, and with the same quantity of acid because of quantity of $TiO_2$ and impurities was nearly the same as during the digestion described above for the leached product obtained from ilmenite.

After dissolution of the powdered sulfate, reduction and removal of all solid particles by filtering, the titanium sulfate solution was adjusted to 3820 liters as above with the following analysis:

Gr./l.
$TiO_2$ ------------------------------------- 245
$H_2SO_4$ as active acid ---------------------- 495
$Ti_2O_3$ ------------------------------------ 4.28
Fe as $FeSO_4$ ------------------------------ 4.52
Other metals as sulfates --------------------- 0.53

The titanium sulfate solution, 3820 liters per short ton of pigment, was hydrolyzed under pressure and finished to high grade pigments as above. The filtered off acid from hydrolysis with about the same analysis was used for second and first leachings without adding any fresh acid, as shown in the flow diagram of FIGURE 2. The acid for the first leaching further diluted to 37% can be used, because the mixture of ⅔ of ore and ⅓ of slag has a lower percentage of $Fe_2O_3$ and has reduced titanium which facilitates the first leaching.

As was previously mentioned, not only can a mixture of slag and ilmenite be used to produce high quality pigment by pressure leaching in two steps under pressure, digestion and pressure hydrolysis in accordance with the applicant's method, but titanium slag as such can be used as raw material for this purpose, if chromium and vanadium compounds are removed by pressure leaching To achieve this, as previously mentioned, as slag must be oxidized prior to or during the leaching operation. The applicant has found that this can be achieved by adding to the charge of slag a sufficient amount of a ferric oxide or by bubbling during the leaching operation an oxidizing gas such as, e.g., air through the slurry, or by adding some minor amount of ferric oxide and then bubbling during the leaching. Such bubbling can be easily accomplished if equipment with forced circulation is used for the pressure leaching, as is described in detail in applicant's Canadian Patent No. 610,334.

As an example, to produce one short ton of pigment from 70% $TiO_2$ slag, 1445 kg. of slag is required. However, to remove chromium and vanadium compounds by leaching process, ten percent of ferric oxide must be added to such a slag, and the total charge per short ton of pigment will be about 1590 kg. The amount of ferric oxide can be diminished to about 5% or less if bubbling of air through the slurry of slag and acid is applied during the leaching carried out under pressure at high temperature.

On the following Table V is shown the analysis of such a slag with 10% ferric oxide added, and analyses of the products obtained by the first and second leaching, respectively.

TABLE V

|  | Slag+10% $Fe_2O_3$ added, percent | Analysis of Dry Product of First Leaching Percent | Analysis of Dry Product of Second Leaching, Percent |
|---|---|---|---|
| $TiO_2$ | 63.64 | 80.20 | 86.50 |
| FeO | 14.00 | | |
| $Fe_2O_3$ | 9.10 | 5.75 | 1.24 |
| $SiO_2$ | 3.28 | 4.40 | 4.80 |
| MnO | 0.25 | 0.19 | 0.15 |
| $Al_2O_3$ | 4.14 | 1.30 | 0.33 |
| MgO | 4.32 | 0.41 | 0.13 |
| CaO | 0.52 | 0.33 | 0.08 |
| $Cr_2O_3$ | 0.18 | 0.04 | 0.018 |
| $V_2O_5$ | 0.52 | 0.07 | 0.022 |
| Other | 0.05 | 0.03 | 0.020 |
| L.O.I | | 7.28 | 6.71 |

To remove from such a slag all impurities except silica, 61.38 parts of $H_2SO_4$ per 100 parts of the charge are required.

On Table VI, the acid requirement for first and second leaching per 100 parts of charge is shown.

TABLE VI

|  | 100 parts of slag+10% $Fe_2O_3$ | $H_2SO_4$ required | 100 parts of first leach product, percent | $H_2SO_4$ required for second leaching |
|---|---|---|---|---|
| $TiO_2$ | 63.64 | | 80.20 | |
| FeO | 14.00 | 19.06 | | |
| $Fe_2O_3$ | 9.10 | 16.80 | 5.75 | 10.57 |
| $SiO_2$ | 3.28 | | 4.40 | |
| MnO | 0.25 | 0.34 | 0.19 | 0.26 |
| $Al_2O_3$ | 4.14 | 11.93 | 1.30 | 3.75 |
| MgO | 4.32 | 10.50 | 0.41 | 1.00 |
| CaO | 0.52 | 0.91 | 0.33 | 0.58 |
| $Cr_2O_3$ | 0.18 | 0.35 | 0.04 | 0.08 |
| $V_2O_5$ | 0.52 | 1.40 | 0.07 | 0.20 |
| Other | 0.05 | 0.09 | 0.03 | 0.06 |
| L.O.I | | | 7.28 | |
| Total | 100 | 61.38 | 100 | 16.50 |

Because, by leaching in two successive steps, the product of the second leaching can be brought to nearly the same purity with the exception of silica and the quantity of fresh acid for digestion is the same per ton of pigment, the titanium sulfate solution can be adjusted to the same degree, 245 gr./l. of $TiO_2$ and 495 gr./l. of $H_2SO_4$ as active acid and the quantity of return acid filtered off after hydrolysis can be kept with the same limit of volume, and nearly the same quality. From the hydrolysis, 3670 liters are filtered off having 509 grams per liter of 1857 kg. of free $H_2SO_4$.

To remove all metallic impurities from the 1590 kg. charge, the acid requirement is $$\frac{1590 \times 61.38}{100} = 976 \text{ kg.}$$

plus 10% excess of $H_2SO_4$ for the first leaching. For the second leaching it will be for 1110 kg. of the dry product of the first leaching:

$$\frac{1110 \times 16.5}{100} = 184 \text{ kg.}$$

of $H_2SO_4$ plus a large excess of acid, i.e., 184×5=920 kg. Having 3670 liters of recirculated acid from hydrolysis with 1857 kg. of free $H_2SO_4$, much more slag can be leached by this acid than is required to produce one short ton of pigment.

As an example, the quantities of slag with added ferric oxide and acid as well as the flow of acid and products are shown in the flow diagram of FIGURE 3. As shown, 1775 kg. of 70% $TiO_2$ slag plus 175 kg. of added ferric oxide was leached a first and second time by this acid in a similar manner and by means of the applicant's continuous leaching equipment as previously described.

To remove all metallic impurities from the 1950 kg. of the charge, the acid requirement is $$\frac{1950 \times 61.38}{100} = 1197 \text{ kg.}$$

of free $H_2SO_4$. 1684 kg. in 3620 liters were used or 1684/1197=1.4 or 40% excess.

It should be stressed that, when slag is leached, it always contains a few percent of reduced titanium as $Ti_2O_3$, facilitating the leaching of such impurities as $Fe_2O_3$, but preventing the oxidation and the removal of chromium and vanadium compounds. Therefore, the addition of required ferric oxide to slag must be calculated with as little excess as possible having regard to the amount required to oxidize all $Ti_2O_3$, chromium and vanadium compounds. To reduce to a minimum the amount of required addition of ferric oxide to a slag, especially to a slag with 74 to 80% of $TiO_2$ which always contains more reduced titanium oxide, oxidizing gas such as air can be used provided that the leaching operation is performed in equipment embodying forced circulation such as described in applicant's Canadian Patent No. 610,334.

The dry product obtained from the first leaching, 1514 kg., was leached for a second time with 2840 liters of return acid from hydrolysis with 1437 kg. of free $H_2SO_4$ instead of the amount normally required $$\left(\frac{1514 \times 16.50}{100} = 251 \text{ kg.}\right)$$

for the removal of impurities or 1437/251=5.73 times the amount required. The slightly used diluted return acid from the second leaching was filtered off in the quantity of 2780 liters with 453 gr./l. of free $H_2SO_4$ with small amount of impurities as sulfates and was directed to the first leaching.

The dry residue from the second leaching, 1380 kg., was divided in two parts. 1120 kg. were used to produce one short ton of pigment as described above in the previous examples while the second part of the residue, 260 kg. per short ton of pigment, can be used if calcined as an excellent welding rod covering material or for other purposes, for example, as replacement of natural rutile.

It is worth mentioning here that the drying of the first and the second leach product can be eliminated if about half a ton of water per ton of pigment is evaporated from the return acid used for second leaching prior to the second leaching and oleum with a minimum of 105% $H_2SO_4$ is used for digestion. In such a case, the first wet leach filter cake can be immediately repulped with evaporated return acid and the resultant slurry fed to the second leaching. In a similar manner the wet cake from the second leaching can be repulped with oleum but it must be immediately fed to digestion.

The main advantages of the present pressure leaching process embodying at least two pressure leaching steps in which during the first leaching practically no excess acid is used and in the second or subsequent leaching operations large quantities of acid are used to remove impurities of the charge are: the acid consumption can be reduced in this way to a required minimum per ton of pigment.

The resultant multi-leach product is of the highest purity and suitable for production of high quality pigment by pressure hydrolysis.

In addition, if ilmenite or titanium slag with over 53% of $TiO_2$ is used for production of titanium pigment, the acid which must be used for digestion and other treatment in finishing of pigment and which, after hydrolysis, is free as return dilute acid is not only sufficient in quantity and quality for leaching operations as required for producing pigment but further, this return acid can be used to produce an excess of leach products for other purposes. The product leached in two steps as produced by applicant's method is the only one suitable for production of high grade titanium dioxide and pigment by pressure hydrolysis.

Titanium slag which requires oxidation to remove the chromium and vanadium compound in leaching operation, can be leached by adding ferric oxide or ilmenite ore with ferric oxide to slag during the first leaching operation under strong oxidizing conditions, and then leached for a second time under neutral or reduction conditions to achieve the best leached product for production of pigment by presure hydrolysis.

I claim:

1. A process for the beneficiation of titaniferous ores which comprises subjecting said ore to pressure leaching in at least two successive stages at an elevated temperature under super-atmospheric pressure, the first leaching stage being carried out with dilute sulfuric acid in a concentration of 25 to 55% by weight and in an amount from 10% less to 10% more than the theoretical amount required to remove all metallic impurities from said ore, the second leaching stage being carried out with dilute sulfuric acid in a concentration of 25% to 50% by weight in a large excess in an amount from 500 to 1000% over the amount theoretically required to remove the metallic impurities remaining in the product obtained from the first step, recovering spent sulfuric acid from said second leaching stage and recirculating said spent acid to said first leaching stage.

2. A process for producing high grade titanium dioxide by leaching, digestion and hydrolysis, using a minimum amount of sulfuric acid, which comprises subjecting a titaniferous ore to pressure leaching in at least two successive stages at an elevated temperature under super-atmospheric pressure, the first leaching stage being carried out with dilute sulfuric acid in a concentration of 25 to 55% by weight and in an amount from 10% less to 10% more than the theoretical amount required to remove all metallic impurities from said ore, the second leaching being carried out with dilute sulfuric acid in a concentration of 25% to 40% by weight in a large excess in an amount from 500% to 1000% over the amount theoretically required to remove the metallic impurities remaining in the product obtained from the first step, recovering the sulfuric acid spent from said second pressure leaching and recirculating said sulfuric acid to said first pressure leaching, subjecting the leached ore to digestion and hydrolysis while adding fresh sulfuric acid in the amount required for said digestion and hydrolysis, recovering the sulfuric acid spent from said digestion and hydrolysis and recirculating said spent sulfuric acid to said first and second pressure leachings and subjecting the hydrolyzed product to calcination and finishing.

3. A process as claimed in claim 2 wherein said ore contains at least 52% $TiO_3$ wherein said sulfuric acid spent from said digestion and hydrolysis is in an amount at least equivalent to the amount of dilute sulfuric acid required in said first and second leaching stages.

4. A process as claimed in claim 3 wherein said ore contains reduced titanium ($Ti_2O_3$) and chromium and vanadium impurities, which further comprises re-oxidizing said ore during said first leaching by adding ilmenite or iron ore containing ferric oxide.

References Cited

UNITED STATES PATENTS

| | | | |
|---|---|---|---|
| 1,947,226 | 2/1934 | Richter | 23—202 |
| 2,109,917 | 3/1938 | Dunn | 23—202 X |
| 2,127,247 | 8/1938 | Dawson | 23—202 |
| 2,516,548 | 7/1950 | Cauwenberg | 23—202 |
| 2,766,133 | 10/1956 | Marcot et al. | 106—300 |
| 2,804,375 | 8/1957 | Kamlet | 23—202 |
| 2,954,278 | 9/1960 | Gaskin | 23—202 |
| 2,961,298 | 11/1960 | Tikkanen | 23—202 |
| 2,980,508 | 4/1961 | Moklebust et al. | 23—202 |
| 3,018,170 | 1/1962 | Soloducha | 23—202 X |
| 3,060,002 | 10/1962 | Leddy et al. | 23—202 |
| 3,193,376 | 7/1965 | Lo et al. | 75—2 |

OSCAR R. VERTIZ, *Primary Examiner.*

EDWARD STERN, MILTON WEISSMAN, *Examiners.*